(12) United States Patent
Haeberer et al.

(10) Patent No.: US 8,960,483 B2
(45) Date of Patent: Feb. 24, 2015

(54) SLOSH POT

(75) Inventors: Rainer Haeberer, Bretten (DE); Matthias Horn, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 1427 days.

(21) Appl. No.: 12/594,105

(22) PCT Filed: Feb. 1, 2008

(86) PCT No.: PCT/EP2008/051239
§ 371 (c)(1),
(2), (4) Date: Feb. 24, 2010

(87) PCT Pub. No.: WO2008/119576
PCT Pub. Date: Oct. 9, 2008

(65) Prior Publication Data
US 2010/0147858 A1    Jun. 17, 2010

(30) Foreign Application Priority Data
Mar. 30, 2007   (DE) .......................... 10 2007 015 395

(51) Int. Cl.
| B60P 3/00 | (2006.01) |
| F01N 3/00 | (2006.01) |
| B60K 15/03 | (2006.01) |
| F01N 3/20 | (2006.01) |

(52) U.S. Cl.
CPC .............. B60K 15/03 (2013.01); F01N 3/2066 (2013.01); B60K 2015/03111 (2013.01); B60K 2015/03348 (2013.01); F01N 2610/1406 (2013.01); Y02T 10/24 (2013.01)
USPC ................ 220/562; 220/563; 60/286; 60/295

(58) Field of Classification Search
USPC .............. 220/4.14, 4.15, 562, 563, 564, 720, 220/734; 123/568, 568.12; 137/581; 206/1.5; 60/286, 39.81
See application file for complete search history.

(56) References Cited

U.S. PATENT DOCUMENTS

| 4,011,848 | A | * | 3/1977 | Coddington ................... 137/469 |
| 5,129,544 | A | | 7/1992 | Jacobson et al. |
| 6,138,857 | A | | 10/2000 | Keller |

FOREIGN PATENT DOCUMENTS

| DE | 19615081 A1 | 10/1997 |
| DE | 19619933 A1 | 11/1997 |
| DE | 102006027487 A1 | 3/2007 |
| EP | 1006014 A2 | 6/2000 |
| JP | 61285122 A | 12/1986 |
| JP | 1067237 A | 3/1998 |
| JP | 2003521631 A | 7/2003 |
| JP | 2006516696 A | 7/2006 |

* cited by examiner

Primary Examiner — Fenn Mathew
Assistant Examiner — Kevin Castillo
(74) Attorney, Agent, or Firm — Michael Best & Friedrich LLP

(57) ABSTRACT

The invention relates to a reservoir tank, particularly for receiving a reducing agent for metering into the exhaust gas tract of an internal combustion engine. A spill basin is accommodated in the hollow space of the reservoir tank. At the base region, the spill basin is radially and axially guided into a recess of the reservoir tank base.

16 Claims, 2 Drawing Sheets

SLOSH POT

CROSS-REFERENCE TO RELATED APPLICATION application is a 35 USC 371 application of PCT/EP2008/051239 filed on Feb. 1, 2008.

BACKGROUND OF THE INVENTION

1. Field of the Invention

The invention relates to a reservoir, particularly for receiving a reducing agent for metering into the exhaust gas tract of an internal combustion engine.

2. Description of the Prior Art

In vehicles with internal combustion engines, the pollutant $NO_x$, among others, has to be reduced because of the increasingly stringent laws on exhaust gases that will come into effect in the next few years. One method that is used is SCR (selective catalytic reduction), in which the pollutant $NO_x$ is reduced to $N_2$ and $H_2O$ with the aid of liquid reducing agent. The liquid reducing agent is stored in a tank and is pumped by the delivery module from the tank to the metering module via a line. Since the reducing agent freezes below a temperature of $-11°$ C., the tank must be equipped with a heater. This heater is switched on as needed and thaws the frozen reducing agent. The heater and a sensor unit are accommodated in a pot. This pot, which simultaneously acts as a slosh pot, as positioned inside the tank. Since there is always an air cushion above the liquid, the tank on principle begins to freeze from the tank base upward. Because of the ice formation, the slosh pot is initially firmly held to the base of the tank.

Since the reducing agent on freezing expands by approximately 10% of its original volume, the slosh pot must be flexibly fixed to the tank cap. If because of the volumetric expansion the frozen reducing agent presses against the tank cap, the tank cap can yield upward because of the flexible fixation of the slosh pot. Thus damage to the slosh pot from ice pressure is precluded. The provision employed thus far requires that the slosh pot be locked in the lower region of the tank and coupled flexibly to the tank cap in the upper region. The locking in the lower region is very complicated to achieve, especially because the corresponding tanks are made by the blowing method, and thus at least one additional welding operation is also required.

From European Patent Disclosure EP 1 561 016, a method for posttreatment of the exhaust from an internal combustion engine is known in which a liquid reducing agent is used as an aid in treatment. If the temperature of the liquid reducing agent drops below a critical value, a partially chemical conversion of the reducing agent in a substance that lowers the freezing point of the reducing agent is brought about.

SUMMARY OF THE INVENTION

According to the invention, it is proposed that a slosh pot for damping motions of a fluid in a tank that in particular receives a reducing agent is guided in an indentation in the tank base radially and axially along a guide portion. To that end, the tank, preferably produced by means of the blowing method, is provided with a number of protuberances, which may for example be embodied in riblike fashion. The riblike protuberances embodied in particular in the tank base of the tank produced by blowing have a contact face, oriented toward the slosh pot that is guided in the indentation of the tank base, and in particular, a conical angle is formed between the protuberances, disposed on the circumference of an indentation in the tank base, and the corresponding recesses in the jacket face of the slosh pot.

By the embodiment of a conical angle between the contact faces of the protuberances, which for example are disposed in a star pattern around the indentation and are preferably rib-like, and the recesses corresponding to them in the jacket face of the slosh pot in its guide region, radial and axial guidance of the slosh pot in guide portions embodied along the wall face of the indentation in the tank base is achieved. The indentation in the tank base simultaneously acts as a pump sump. Protuberances preferably embodied in riblike fashion are preferably embodied in the tank base, for example in a 120° arrangement to one another, in the tank blow mold, and the slosh pot with its guide region, which has a number of recesses corresponding to the number of protuberances embodied in the tank base, is inserted.

By means of the at least three protuberances, embodied in riblike fashion in the tank base around an indentation, and by means of the recesses corresponding to them in the jacket face on the slosh pot, the radial fixation of the slosh pot and tank relative to one another occurs from the formation of the conical angle, that is, a conicity between the indentation and the slosh pot. Moreover, a partial embodiment of the protuberances, embodied in particular in riblike fashion, causes the reducing agent stored in the tank to be capable of flowing into the sump region of the tank.

The slosh pot is preferably axially tensed against the tank cap by means of a spring element. Because of the fixation in the tank, that is, inside the guide region between the recesses, embodied in the jacket face of the slosh pot, and the preferably riblike protuberances corresponding to them in the tank base, the slosh pot is supported in shakeproof fashion by the spring element, which acts axially, in the hollow space of the tank that stores the reducing agent.

BRIEF DESCRIPTION OF THE DRAWINGS

The invention is described in further detail below in conjunction with the drawings, in which.

DESCRIPTION OF THE PREFERRED EMBODIMENTS

Figure 1:
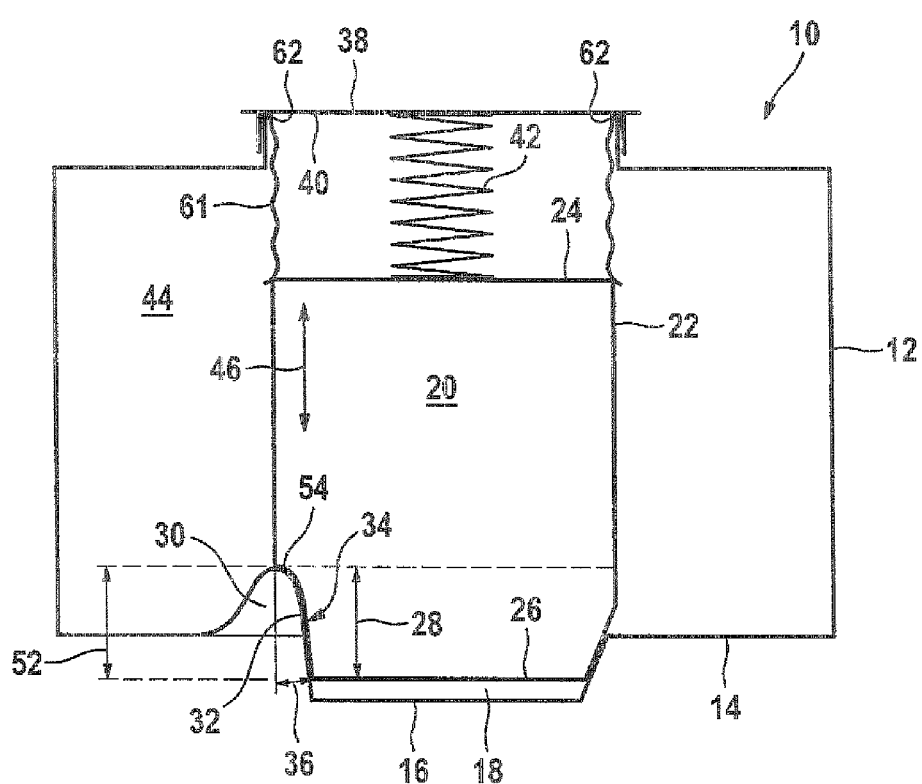
FIG. 1 is a side view of the slosh pot, guided radially and axially in the tank inside a guide region on the tank base.

In FIG. 1, the tank, which serves in particular to receive a reducing agent, is shown, in the tank base of which a guide region for guiding a slosh pot, prestressed by means of a spring, is embodied.

FIG. 1 shows a tank 10, which is defined by a tank wall 12 and a tank base 14. The tank 10 is preferably made by the blowing method in a blow mold and produced from plastic.

The tank 10 includes the tank base 14, in which an indentation 16 is embodied that forms a sump 18. A reducing agent, for conditioning the exhaust gas, that freezes below an outdoor temperature of $-11°$ C. is preferably received in the tank 10.

It can be seen from the view in FIG. 1 that a slosh pot 20 is movably received in the tank 10. The slosh pot 20 has a jacket face 22 as well as a top side 24 and a base 26.

From the view in FIG. 1, it can be seen that the slosh pot 20 is guided with its guide region 28, embodied in the lower region of the jacket face 22, in the indentation 16 of the tank base 14. To that end, in the tank base 14 around the indentation 16, a number of preferably riblike protuberances 30 are embodied, disposed for instance in a circle. These protuberances 30 embodied in particular in riblike fashion may be embodied for example in an angular distribution of 120° (see the view in FIG. 2) around the indentation 16 in the tank base 14. The protuberance 30 shown in FIG. 1 may for example be let into the blow mold in which the tank 10, made by way of the blow molding process, is fabricated. From FIG. 1, it can be seen that the preferably riblike protuberance 30 has a contact face 32. The contact face 32 extends across the guide region 28, that is, the lower region of the jacket face 22 of the slosh pot 20 that is received axially movably in the indentation 16 in accordance with the course of motion 46.

Especially good axial and radial guidance of the slosh pot 20 can be attained by means of a conicity 34 that is produced between the contact faces 32 and the recess, corresponding to it in the jacket face 22 in the guide region 28 of the slosh pot 20. In particular, the conicity 34 between the contact faces 32 and the jacket face 22 of the slosh pot 20 can be characterized by a conical angle 36 that can be in the range between 5° and 15°.

A number of preferably riblike protuberances 30 is preferably made in the tank base 14, around the indentation 16, so that the slosh pot 20 is guided axially and radially in a guide region 28 at least three points in the indentation 16 of the tank base 14.

As also seen from the view in FIG. 1, the top side 24 of the slosh pot 20 is acted upon by an elastic element 42, embodied for example as a spring. The elastic element 42 is braced not only the top side 24 of the slosh pot 20 but also on an inside 40 of the tank cap 38 that closes the tank 10. The action on the slosh pot 20 by the spring element 42 shown in FIG. 1 causes tensing of the slosh pot 20 against the tank cap 38. Because of this fixation in the hollow space 44 of the tank 10, the slosh pot 20 is supported in shakeproof fashion in the hollow space 44 of the tank 10. The rigidity of the support can be attained by varying the height of the guide region 28, or in other words by varying the region in which the contact faces 32 of the preferably riblike protuberances 30 engage correspondingly embodied recesses in the jacket face 22 of the slosh pot 20. The greater the axial length selected for this guide region 28, the longer is the resultant guidance of the slosh pot 20 relative to the indentation 16 in the tank base 14, and therefore the taller the slosh pot 20 can be.

Figure 2:
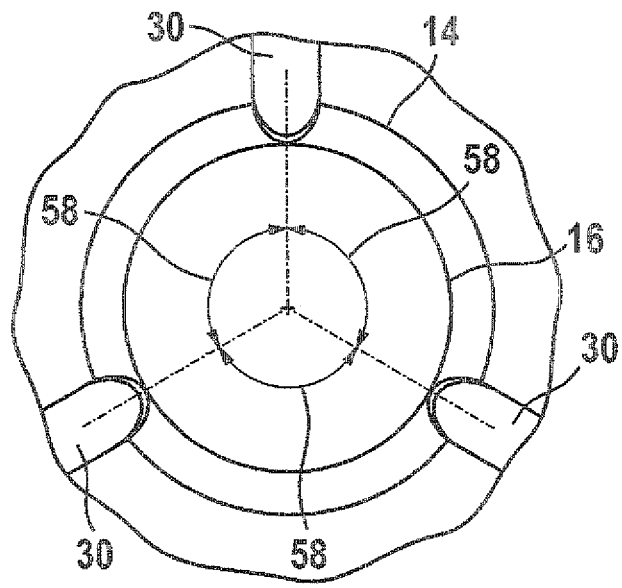
FIG. 2 is a top view on the tank base, with the slosh pot removed from the tank.

FIG. 2 shows a view of the tank base of the tank shown in FIG. 1, without showing the slosh pot.

From FIG. 2, it can be seen that in an angular distribution 58, for example of 120°, in the tank base 14 around the indentation 16, three preferably riblike protuberances 30 are disposed. Instead of the three preferably riblike protuberances 30 shown in the tank base 14 around the indentation 16, protuberances 30 may instead be provided in the tank base 14. The 120° distribution 58, as shown in FIG. 2, results from the preferably riblike protuberances. Because of the partial embodiment of the protuberances in the indentation 16 embodied in the tank base 14, a residue of the reducing agent collects in the sump 18, as shown in FIG. 1.

Figure 3:
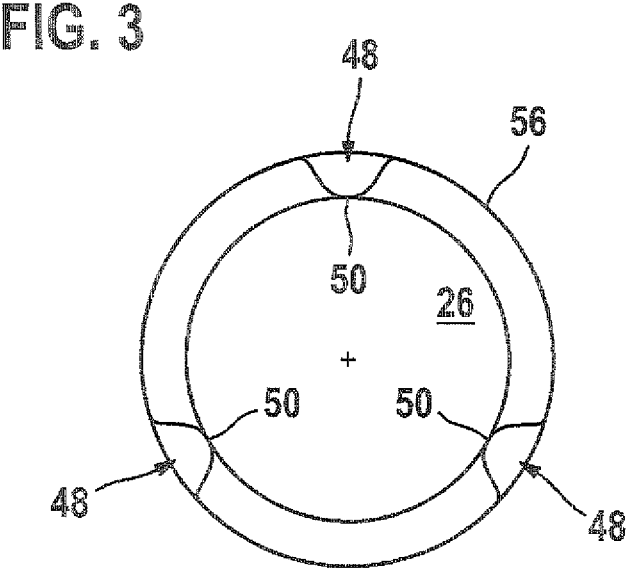
FIG. 3 is the bottom face of the slosh pot as shown in FIG. 1, with recesses shown on the circumference.

The bottom of the slosh pot can be seen in the view in FIG. 3.

FIG. 3 shows that along the circumference 56 of the base 26 of the slosh pot 20, a number of recesses 48 corresponding to the number, shown in FIG. 3, of the preferably riblike protuberances 30 is disposed. In the view in FIG. 3, the recesses 48 are embodied with a curvature 50, which is engaged by the various protrusions of the preferably riblike protuberances 30 shown in FIG. 2, which are embodied around the indentation 16 in the tank base of the tank 10. Because of the difference in diameter between the curvature 50 and the various tips of the preferably riblike protuberances 30, free spaces are created, by way of which the reducing agent stored in the hollow space 44 of the tank can flow to the sump 18. Because of the differences in diameter between the curvatures 50 on the circumference 56 of the base 26 and in the guide region 28 of the jacket face 22 of the slosh pot 20 and the preferably riblike protuberances, an axial and radial guidance of the slosh pot 20 can be attained in the indentation 16 in the tank base 14. Since the sump 18, with regard to the geometry of the tank 10, is embodied as shown in FIG. 1 on the underside in the tank base 14, freezing of the reducing agent in the sump 18 causes a vertical displacement of the slosh pot 22 counter to the action of the elastic element 42, which is braced on the inside 40 of the tank cap 38. From FIG. 1 it can be seen that depending on the coverage, that is, the length of the guide region 28 between the contact faces 32 of the preferably riblike protuberances in the tank base 14, corresponding recesses 48 (see the view in FIG. 3) in the base 26 and in the jacket face 22 of the slosh pot 20, a vertical displacement in accordance with the course of motion, represented by the double arrow 46, of the slosh pot 20 relative to the guide region 28 can be compensated for. By the action on the top side 24 of the slosh pot 20 by the elastic element 42, a shakeproof disposition of the slosh pot 20 in the tank 10 can be achieved, since the slosh pot is on the one hand guided axially and radially in the guide region 28 in the indentation 16 in the tank base 14 and on the other is prestressed by the elastic element 42 on its top side in the axial direction.

Between the cap 38 and the slosh pot 20, there is an elastomer seal 61. It seals at a region 62 in the vicinity of the cap 38. The elastomer seal 61 is lengthened in the axial direction and is pulled up onto the upper edge of the slosh pot 20 and secured there in the context of a press fit in the upper region. The elastomer seal 61 lends the slosh pot 20 greater radial stability. Second, the elastomer seal 61 prevents the slosh pot 20 from emptying, for instance when the car is going around a sharp curve. The liquid splashes against the elastomer seal 61 and from there runs back into the slosh pot 20. The elastomer seal 61 has an axial elasticity, which can absorb a volumetric expansion of the reducing agent at the phase transition from liquid to solid.

The foregoing relates to the preferred exemplary embodiments of the invention, it being understood that other variants and embodiments thereof are possible within the spirit and scope of the invention, the latter being defined by the appended claims.

The invention claimed is:

1. A reservoir tank for receiving a reducing agent for metering into the exhaust gas of an internal combustion engine, in which the tank is defined by a tank wall, a tank base having an indentation in a portion thereof, and a tank cap, a slosh pot being received in a hollow space of the tank, an axially movable guide region portion of the slosh pot being disposed within the indentation, the guide region portion of the slosh pot being guided axially and radially in the indentation, wherein the tank base includes a plurality of protuberances arranged in a circular fashion around the indentation in the tank base, wherein a top side of the slosh pot is subjected to an axial prestressing force by an elastic element.

2. The tank as defined by claim 1, wherein an indentation forming a sump is embodied in the tank base of the tank.

3. The tank as defined by claim 1, wherein the protuberances in the tank base have a curved contact face.

4. The tank as defined by claim 2, wherein the protuberances in the tank base have a curved contact face.

5. A reservoir tank for receiving a reducing agent for metering into the exhaust gas of an internal combustion engine, in which the tank is defined by a tank wall, a tank base, and a tank cap, a slosh pot being received in a hollow space of the tank, the slosh pot being guided axially and radially in a guide region in an indentation in the tank base, wherein a number of protuberances is formed in the tank base, which protuberances are arranged in a circular fashion around the indentation in the tank base, wherein the protuberances in the tank base each have a curved contact face, and wherein the curvatures of the contact faces of the protuberances in the tank base correspond to curvatures of recesses in a jacket face of the slosh pot.

6. The tank as defined by claim 1, wherein the elastic element is braced on the tank cap.

7. A reservoir tank for receiving a reducing agent for metering into the exhaust gas of an internal combustion engine, in which the tank is defined by a tank wall, a tank base, and a tank cap, a slosh pot being received in a hollow space of the tank, the slosh pot being guided axially and radially in a guide region in an indentation in the tank base, wherein a number of protuberances is formed in the tank base, which protuberances are arranged in a circular fashion around the indentation in the tank base, wherein a number of recesses, corresponding to the number of the protuberances, are embodied along a guide region on a jacket face of the slosh pot.

8. The tank as defined by claim 1, wherein a number of recesses, corresponding to the number of the protuberances, are embodied along a guide region on a jacket face of the slosh pot.

9. The tank as defined by claim 2, wherein a number of recesses, corresponding to the number of the protuberances, are embodied along a guide region on a jacket face of the slosh pot.

10. The tank as defined by claim 7, wherein the recesses embodied on a circumference of the base and on the jacket face in the guide region have a curvature.

11. The tank as defined by claim 8, wherein the recesses embodied on a circumference of the base and on the jacket face in the guide region have a curvature.

12. The tank as defined by claim 9, wherein the recesses embodied on a circumference of the base and on the jacket face in the guide region have a curvature.

13. The tank as defined by claim 10, wherein a radius of curvature of the protuberances in the tank base is shorter than a radius of the curvature of the recesses on the circumference of the base and on the jacket face of the slosh pot in the guide region thereof.

14. The tank as defined by claim 1, wherein the protuberances are riblike.

15. The tank as defined by claim 1, wherein the protuberances extend into the indentation.

16. The tank as defined by claim 3, wherein the slosh pot is disposed at least partially within the contact faces of the protuberances.

* * * * *